(12) United States Patent
Messick et al.

(10) Patent No.: US 11,099,961 B2
(45) Date of Patent: Aug. 24, 2021

(54) SYSTEMS AND METHODS FOR PREVENTION OF DATA LOSS IN A POWER-COMPROMISED PERSISTENT MEMORY EQUIPPED HOST INFORMATION HANDLING SYSTEM DURING A POWER LOSS EVENT

(71) Applicant: Dell Products L.P., Round Rock, TX (US)

(72) Inventors: Doug E. Messick, Austin, TX (US); Aaron M. Rhinehart, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 194 days.

(21) Appl. No.: 16/353,825

(22) Filed: Mar. 14, 2019

(65) Prior Publication Data

US 2020/0293419 A1 Sep. 17, 2020

(51) Int. Cl.
*G06F 11/30* (2006.01)
*G06F 1/30* (2006.01)

(52) U.S. Cl.
CPC .......... *G06F 11/3037* (2013.01); *G06F 1/305* (2013.01); *G06F 11/3055* (2013.01)

(58) Field of Classification Search
CPC ............. G06F 11/3037; G06F 11/3055; G06F 11/3058; G06F 11/3062; G06F 1/305; G06F 1/30; G11C 5/005
See application file for complete search history.

(56) References Cited

U.S. PATENT DOCUMENTS

| | | | |
|---|---|---|---|
| 9,710,343 B2* | 7/2017 | Petersen | G06F 1/30 |
| 10,156,987 B1* | 12/2018 | Gutierrez | G06F 11/3034 |
| 2006/0069870 A1* | 3/2006 | Nicholson | G06F 11/1441 711/118 |
| 2010/0180131 A1* | 7/2010 | Liu | G06F 1/305 713/300 |
| 2011/0126046 A1* | 5/2011 | Hoang | G06F 1/30 714/14 |
| 2013/0097458 A1* | 4/2013 | Sekino | G06F 1/30 714/6.3 |
| 2015/0149806 A1* | 5/2015 | Lucas | G06F 3/0647 713/330 |
| 2015/0309951 A1* | 10/2015 | Breakstone | G05B 11/01 710/313 |
| 2016/0224359 A1* | 8/2016 | Ayanam | G06F 3/06 |
| 2017/0177374 A1* | 6/2017 | Morning-Smith | G06F 1/263 |
| 2017/0185495 A1* | 6/2017 | Jau | G06F 11/2015 |

* cited by examiner

*Primary Examiner* — Yolanda L Wilson
(74) *Attorney, Agent, or Firm* — Jackson Walker L.L.P.

(57) ABSTRACT

A method may include, in a host information handling system configured to be inserted into a chassis providing a common hardware infrastructure to a plurality of modular information handling systems including the information handling system: (i) determining a runtime health status of a persistent memory subsystem of the host information handling system; and (ii) communicating a health status indicator indicative of the runtime health status to a management module configured to manage the common hardware infrastructure.

9 Claims, 3 Drawing Sheets

SYSTEMS AND METHODS FOR PREVENTION OF DATA LOSS IN A POWER-COMPROMISED PERSISTENT MEMORY EQUIPPED HOST INFORMATION HANDLING SYSTEM DURING A POWER LOSS EVENT

TECHNICAL FIELD

The present disclosure relates in general to information handling systems, and more particularly to methods and systems for prevention of data loss in a power-compromised persistent memory equipped host information handling system during a power loss event.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems are increasingly using persistent memory technologies such as Non-Volatile Dual In-line Memory Modules (NVDIMMs). An NVDIMM is a memory module that may retain data even when electrical power is removed whether from an unexpected power loss, system crash, or from a normal system shutdown. To enable such functionality, an NVDIMM may include a traditional dynamic random access memory (DRAM) which may store data during normal operation when electrical power is available from one or more power supply units and a flash memory to back up data present in the DRAM when a loss of electrical power from the power supply units occurs. A battery, capacitor, or other energy storage device either internal or external to the NVDIMM may supply electrical energy for a "save" operation to transfer data from the DRAM to the flash memory in response to a power loss event from the power supply units. The transfer of data from DRAM to flash memory is not typically visible to an operating system executing on an information handling system, instead being performed as a background operation on the NVDIMM itself.

In some instances, persistent memory on a server node is powered by a local power source during a save operation.

In a modular chassis ecosystem there may be multiple Persistent Memory Equipped (PME) information handling system sleds, each with a local power source (e.g., battery backup unit (BBU), super cap, or other energy storage device). Chassis infrastructure, such as fans or other monitoring hardware, may be required to be powered during the save operation. Each information handling system sled in a modular chassis may be configured to include persistent memory, but only those that are equipped with persistent memory which requires a local power source may participate in a persistent memory save (PM Save) operation after a chassis unexpectedly loses external power. During the PM Save operation, certain portions of the chassis infrastructure may be required to be powered from the chassis common system voltage rail. All of the local power sources are tied together at the main chassis common system voltage rail, and current sharing is enabled between the power sources. Each local sled power source may be sized to power the local server and the chassis infrastructure for the time duration of the persistent memory save operation.

Typically using traditional approaches, local information handling system sled power sources are not sized to support operation of one or more parallel nodes with failed power sources. If a single local sled power source fails during a persistent memory save operation, and if the total power capacity of the remaining local sleds is insufficient to meet the total power requirements of the chassis infrastructure, the non-failed information handling system sleds, and the failed information handling system sled, the save operation may fail, the chassis may shut down, and data may be lost for all information handling system nodes.

A PME information handling system sled may evaluate its configuration and health during boot and complete a PM arming function in the event the PM subsystem is healthy. Thus, it is expected that the PM subsystem will not experience any data loss in the case of a full or partial power loss scenario. Thus, a modular server with a healthy PM subsystem at boot time may arm itself for a future PM save event. However, such modular server may have issues during run-time that may compromise the integrity of the PM subsystem. If a PM save event occurs due to a partial power loss while a PM server is compromised, then existing implementations, which define a PM save as a battery powered process of a defined fixed duration followed by a power cycle of the power supply units, may result in data loss.

SUMMARY

In accordance with the teachings of the present disclosure, the disadvantages and problems associated with existing approaches to maintaining persistent memory in a chassis environment may be reduced or eliminated.

In accordance with embodiments of the present disclosure, a method may include, in a host information handling system configured to be inserted into a chassis providing a common hardware infrastructure to a plurality of modular information handling systems including the information handling system: (i) determining a runtime health status of a persistent memory subsystem of the host information handling system; and (ii) communicating a health status indicator indicative of the runtime health status to a management module configured to manage the common hardware infrastructure.

In accordance with these and other embodiments of the present disclosure, a method may include, in response to a partial power loss in a chassis providing a common hardware infrastructure to a plurality of modular information handling systems, causing powering on of energy storage devices integral to the plurality of modular information handling systems, causing healthy power supply units configured to provide electrical energy to the plurality of modular information handling systems and other components of the chassis to remain powered on, determining whether any persistent memory subsystem of the plurality of modular information handling systems has an unhealthy health status and responsive to determining that at least one of the persistent memory subsystems of the plurality of modular information handling systems has an unhealthy health status, powering off the healthy power supply only after individual persistent memory save operations have completed on all of the plurality of modular information handling systems.

In accordance with these and other embodiments of the present disclosure, an article of manufacture may include a non-transitory computer-readable medium and computer-executable instructions carried on the computer-readable medium. The instructions may be readable by a processor, the instructions, when read and executed, for causing the processor to, in a host information handling system configured to be inserted into a chassis providing a common hardware infrastructure to a plurality of modular information handling systems including the information handling system: (i) determine a runtime health status of a persistent memory subsystem of the host information handling system; and (ii) communicate a health status indicator indicative of the runtime health status to a management module configured to manage the common hardware infrastructure.

In accordance with these and other embodiments of the present disclosure, an article of manufacture may include a non-transitory computer-readable medium and computer-executable instructions carried on the computer-readable medium, the instructions readable by a processor, the instructions, when read and executed, for causing the processor to, in response to a partial power loss in a chassis providing a common hardware infrastructure to a plurality of modular information handling systems: (i) cause powering on of energy storage devices integral to the plurality of modular information handling systems; (ii) cause healthy power supply units configured to provide electrical energy to the plurality of modular information handling systems and other components of the chassis to remain powered on; (iii) determine whether any persistent memory subsystem of the plurality of modular information handling systems has an unhealthy health status; and (iv) responsive to determining that at least one of the persistent memory subsystems of the plurality of modular information handling systems has an unhealthy health status, power off the healthy power supply only after individual persistent memory save operations have completed on all of the plurality of modular information handling systems.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
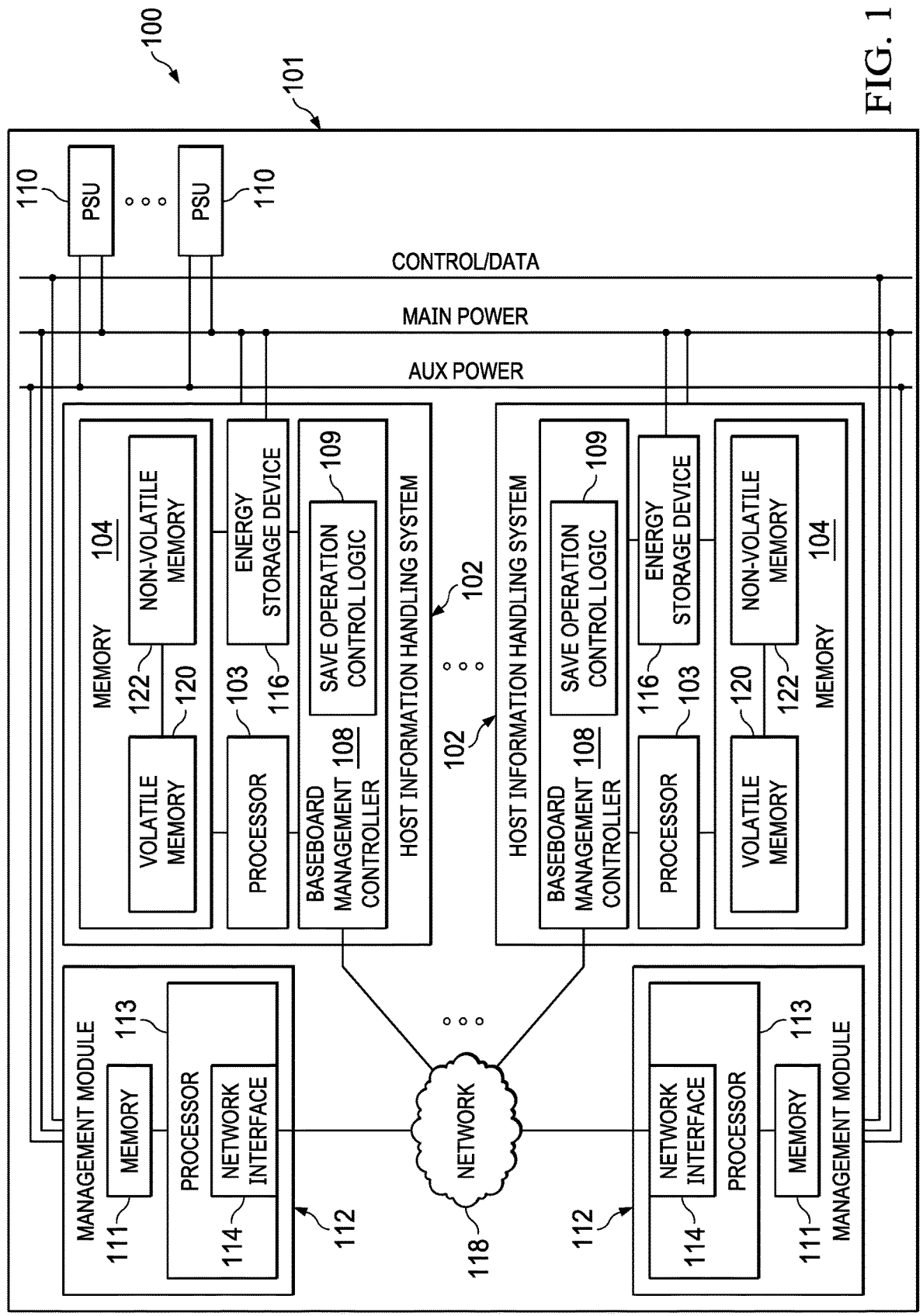
FIG. 1 illustrates a block diagram of an example system, in accordance with embodiments of the present disclosure.
Figure 2:
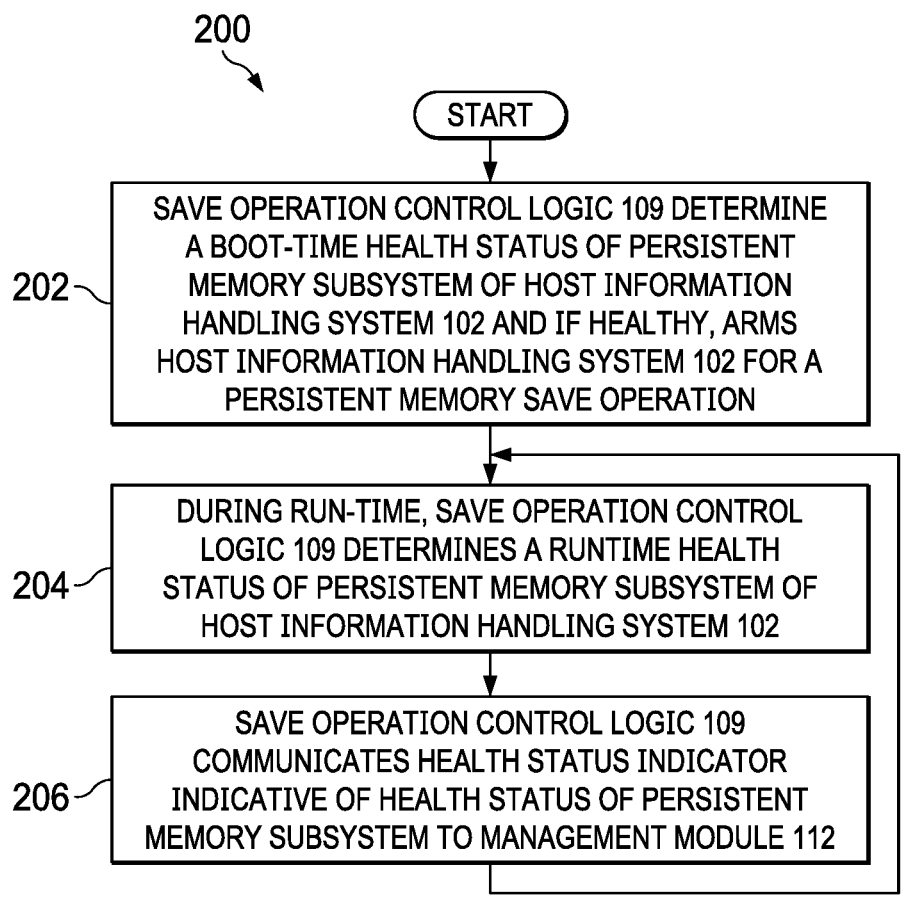
FIG. 2 illustrates a flow chart of an example method for monitoring health of a local persistent memory subsystem of an information handling system during runtime of the information handling system, in accordance with embodiments of the present disclosure.
Figure 3:
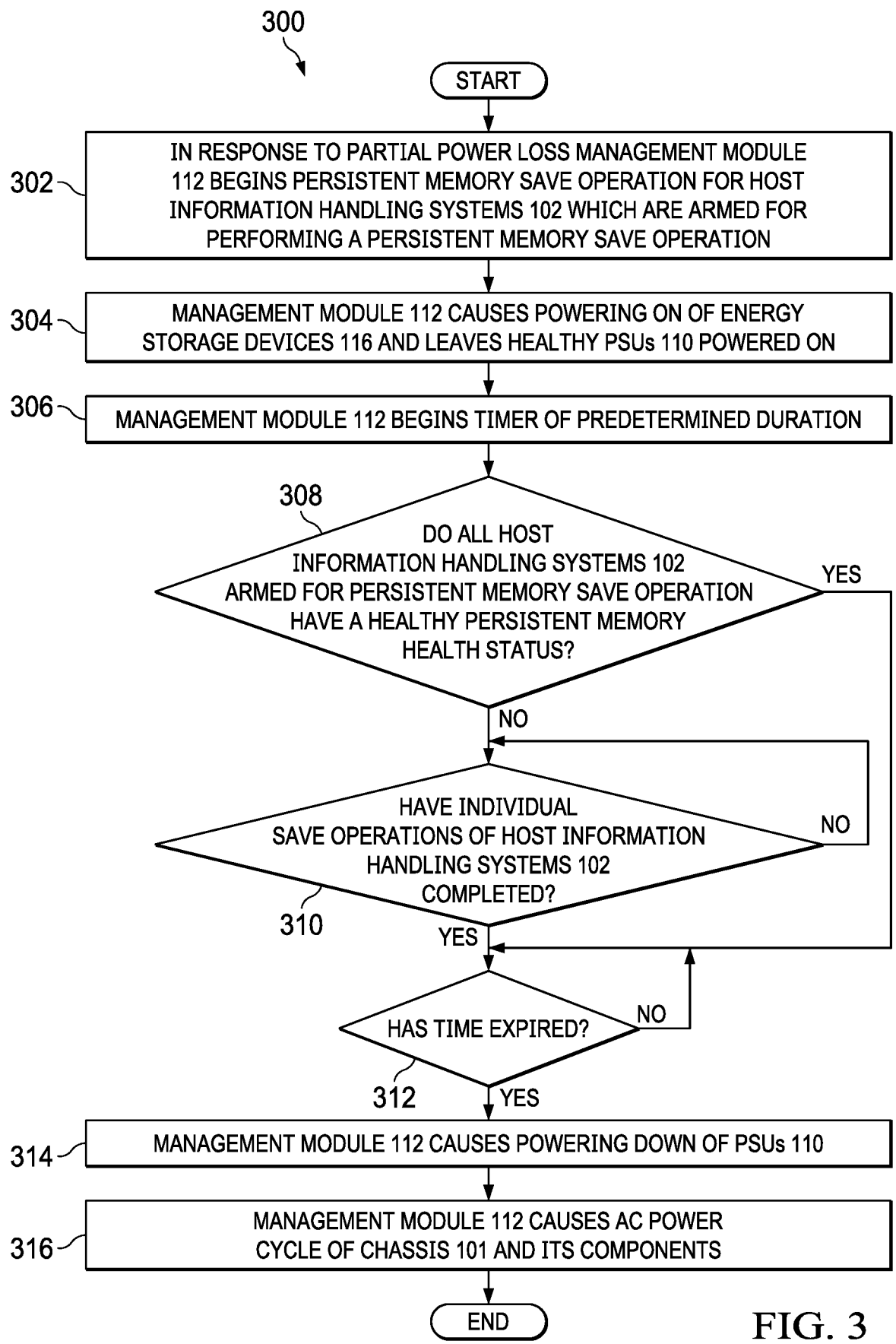
FIG. 3 illustrates a flow chart of an example method for controlling components of a chassis during performance of a save operation, in accordance with embodiments of the present disclosure.

Preferred embodiments and their advantages are best understood by reference to FIGS. 1 through 3, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, and/or any other components and/or elements of an information handling system.

FIG. 1 illustrates a block diagram of an example system 100, in accordance with embodiments of the present disclosure. As shown in FIG. 1, system 100 may comprise a chassis 101 for enclosing a plurality of information handling resources, including a plurality of modular host information handling systems 102 (e.g., sleds), one or more management modules 112, an internal network 118, and a power system comprising one or more power supply units (PSUs) 110.

Chassis 101 may include any suitable enclosure for housing the various components of system 100, and may also be referred to as a rack, tower, enclosure, and/or housing.

As shown in FIG. 1, a host information handling system 102 may include a processor 103, a memory 104 communicatively coupled to processor 103, a baseboard management controller 108 communicatively coupled to processor 103, and an energy storage device 116.

A processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in an associated memory 104 and/or another component of its associated information handling system 102.

A memory 104 may be communicatively coupled to an associated processor 103 and may include any system, device, or apparatus configured to retain program instructions and/or data for a period of time (e.g., computer-readable media). A memory 104 may include RAM, EEPROM, a PCMCIA card, flash memory, magnetic storage, opto-magnetic storage, or any suitable selection and/or array of volatile or non-volatile memory that retains data after power to information handling system 102 is turned off. As shown in FIG. 1, memory 104 may comprise a persistent memory (e.g., comprising one or more NVDIMMs) that includes a volatile memory 120 (e.g., DRAM or other volatile random-access memory) and non-volatile memory 122 (e.g., flash memory or other non-volatile memory). During normal operation, when PSUs 110 provide adequate power to components of information handling system 102, data written to memory 104 from processor 103 may be stored in volatile memory 120. However, in the event of loss of system input power or a power fault of PSUs 110 that prevents delivery of adequate electrical energy from PSUs 110 to memory 104, data stored in volatile memory 120 may be transferred to non-volatile memory 122 in a save operation. After input power is restored, or a faulty PSU 110 is replaced, such that PSUs 110 are again operable to provide sufficient electrical energy to information handling resources of an information handling system 102, on the subsequent power-on of information handling system 102, data may be copied from the non-volatile memory 122 back to volatile memory 120 via a restore operation. The combined actions of data save and then data restore allows the data to remain persistent through a power disruption. Although not explicitly shown in FIG. 1, memory 104 may also include hardware, firmware, and/or software for carrying out save operations.

A baseboard management controller 108 may be configured to provide out-of-band management facilities for management of information handling system 102. Such management may be made by baseboard management controller 108 even if information handling system 102 is powered off or powered to a standby state. In certain embodiments, baseboard management controller 108 may include or may be an integral part of a remote access controller (e.g., a Dell Remote Access Controller or Integrated Dell Remote Access Controller).

As shown in FIG. 1, baseboard management controller 108 may include save operation control logic 109. Save operation control logic 109 may comprise any system, device, or apparatus configured to monitor a health status of an energy storage device 116 of a host information handling system 102 and selectively enable or disable the execution of save operations on such host information handling system 102, as described in greater detail below. Although FIG. 1 depicts save operation control logic 109 as integral to baseboard management controller 108, in some embodiments, save operation control logic 109 may be external to baseboard management controller 108 and may be embodied in a complex programmable logic device or other suitable piece of electronic hardware.

An energy storage device 116 may comprise any system, device, or apparatus configured to store energy which may be used by memory 104 to perform save operations in response to a loss of an input source of energy (e.g., loss of alternating current or direct current source) or other power fault of one or more PSUs 110. In some embodiments, energy storage device 116 may comprise a battery configured to convert stored chemical energy into electrical energy. In other embodiments, energy storage device 116 may comprise a capacitor or "supercap" configured to store electrical energy and deliver such electrical energy to memory 104 when needed to perform save operations (e.g., by closure of a switch to electrically couple such capacitor to components of memory 104). Although energy storage device 116 is shown in FIG. 1 as external to memory 104, in some embodiments energy storage device 116 may be integral to memory 104. In these and other embodiments, energy storage device 116 may be charged from one or more PSUs 110. In some embodiments, an energy storage device 116 may be communicatively coupled to an associated baseboard management controller 108 via a systems management interface such as, for example, Inter-Integrated Circuit (i2C), System Management Bus (SMBus) or Power Management Bus (PMBus), allowing baseboard management controller 108 to receive health and status (e.g., state of charge) from and/or communicate commands to energy storage device 116. In some embodiments, energy storage device 116 may provide energy to a plurality of persistent memory 104 devices.

Although, for the purposes of clarity and exposition, FIG. 1 depicts only two host information handling systems 102 within system 100, it is understood that system 100 may comprise any suitable number of host information handling systems 102.

In addition to a processor 103, a memory 104, a baseboard management controller 108, and an energy storage device 116, a host information handling system 102 may include one or more other information handling resources. For example, in some embodiments, a host information handling system 102 may include more than one energy storage device 116 and/or more than one memory 104.

A management module 112 may be configured to provide out-of-band management facilities for management of shared chassis infrastructure of system 100, such as air movers, PSUs 110, and/or other components shared by a plurality of host information handling systems 102. Such management may be made by management module 112 even if system 100 is powered off or powered to a standby state. Management module 112 may include a processor 113 and one or more memories 111. In certain embodiments, management module 112 may include or may be an integral part of an enclosure controller (EC). In other embodiments, management module 112 may include or may be an integral part of a chassis management controller (CMC).

Processor 113 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 113 may interpret and/or execute program instructions (e.g., firmware) and/or process data stored in memory 111 and/or another component of system 100 or management module 112. In some embodiments, processor 113 may comprise an enclosure controller configured to execute firmware relating to functionality as an enclosure controller. As shown in FIG. 1, processor 113 may include a network interface 114 for communicating with an internal network 118 of system 100.

Memory 111 may be communicatively coupled to processor 113 and may include any system, device, or apparatus configured to retain program instructions and/or data for a period of time (e.g., computer-readable media). Memory 111 may include RAM, EEPROM, a PCMCIA card, flash memory, magnetic storage, opto-magnetic storage, or any suitable selection and/or array of volatile or non-volatile memory that retains data after power to management module 112 is turned off.

Internal network 118 may comprise any suitable system, apparatus, or device operable to serve as communication infrastructure for network interfaces 114 to communicate to one another and one or more other components, such as baseboard management controllers 108 of host information handling systems 102.

At a given moment, one management module 112 may be "active" in that it is actively functional and performing its functionality, while another management module 112 is in a "standby" mode and may become active in the event that the active management module 112 experiences a fault or failure that causes it to failover to the standby management module 112.

Generally speaking, a PSU 110 may include any system, device, or apparatus configured to supply electrical current to one or more information handling resources of system 100. As shown in FIG. 1, a PSU 110 may provide electrical energy via (a) a main power rail, indicated in FIG. 1 as "MAIN POWER," and (b) an auxiliary power rail, indicated in FIG. 1 as "AUX POWER." The main power rail may generally be used to provide power to information handling resources of a host information handling system 102 when such host information handling system 102 is turned on and/or to provide power to certain components of system 100. On the other hand, the auxiliary power rail may generally be used to provide power to certain auxiliary information handling resources when energy is not supplied via the main power rail. For example, the auxiliary power rail may be used to provide power to baseboard management controller 108 when electrical energy is not provided to processor 103, memory 104, and/or other information handling resources via the main power rail. As another example, the auxiliary power rail may be used to provide power to management module 112 when electrical energy is not provided to host information resources 102 via the main power rail.

In some embodiments, a management module 112 may be configured to communicate with one or more PSUs 110 to communicate control and/or telemetry data between management module 112 and PSUs 110. For example, a PSU 110 may communicate information regarding status and/or health of such PSU 110 and/or measurements of electrical parameters (e.g., electrical currents or voltages) present within such PSU 110.

In addition to host information handling systems 102, management modules 112, internal network 118, and PSUs 110, system 100 may include one or more other information handling resources.

Further, while FIG. 1 depicts system 100 as having two persistent-memory equipped host information handling systems 102, it is understood that system 100 may be capable of receiving modular host information handling systems 102 of varying forms, functions, and/or structures. For example, in some embodiments, a host information handling system 102 present in system 100 may include only non-persistent memory.

In operation, as described in greater detail below, save operation control logic 109 of each host information handling system 102 may monitor the persistent memory health of the host information handling system 102 during runtime and communicate an indication of such health to management module 112. Further, a management module 112 (e.g., the active management module 112) may utilize such indication of health from each host information handling system 102 to optimize a persistent memory save event if any of host information handling systems 102 have unhealthy persistent memory subsystems in order to minimize potential for data loss.

In existing approaches, a host information handling system 102 may perform a series of checks prior to allowing its persistent memory 104 to be declared as "armed." In these approaches, when a host information handling system 102 is armed for a persistent memory event such as a full or partial power loss, it is assumed that its persistent memory 104 was healthy when armed at boot time. However, using existing approaches, persistent memory health of a host information handling system 102 is not analyzed during runtime. To overcome these shortcomings of traditional approaches, save operation control logic 109 or another component of a baseboard management controller 108 may, during runtime of host information handling system 102, monitor one or more characteristics of a host information handling system 102 in order to determine a health status of the persistent memory subsystem of such host information handling system 102. The one or more characteristics that may be monitored to determine health status include, without limitation, a health or charging level of energy storage device 116, a health or other status of voltage regulators associated with memory 104, an occurrence of correctable and/or uncorrectable memory errors, and thermal statuses of memory 104, processor 103, and/or other components of host information handling system 102.

Baseboard management controller 108 may monitor or otherwise be alerted to warnings and/or failures regarding persistent memory subsystem health, and may maintain a variable, which may be referred to as a health status indicator, indicative of the overall health and/or risk associated with a persistent memory subsystem of information handling system 102. In some embodiments, the health status indicator may be a binary value, indicating a status of either "healthy" or "unhealthy."

FIG. 2 illustrates a flow chart of an example method 200 for monitoring health of a local persistent memory subsystem of a host information handling system 102 during runtime of the host information handling system 102, in accordance with embodiments of the present disclosure. According to some embodiments, method 200 may begin at step 202. As noted above, teachings of the present disclosure may be implemented in a variety of configurations of information handling system 102. As such, the preferred initialization point for method 200 and the order of the steps comprising method 200 may depend on the implementation chosen.

At step 202, after powering on and/or rebooting of a host information handling system 102, save operation control logic 109 may determine a boot-time health status of the persistent memory subsystem of host information handling system 102 and if host information handling system 102 is healthy, arm the host information handling system 102 for a persistent memory save operation.

At step 204, during run-time of the host information handling system 102, save operation control logic 109 may determine a runtime health status of the persistent memory subsystem of the host information handling system 102, and store a health status indicator indicative of such runtime health status.

At step 206, save operation control logic 109 may communicate the health status indicator to a management module 112. After completion of step 206, method 200 may proceed again to step 204, and save operation control logic 109 may continue to monitor the health status of the persistent memory subsystem of the host information handling subsystem 102 and report, with updates as needed, such health status via communication of the health status indicator to management module 112.

Although FIG. 2 discloses a particular number of steps to be taken with respect to method 200, method 200 may be executed with greater or fewer steps than those depicted in FIG. 2. In addition, although FIG. 2 discloses a certain order of steps to be taken with respect to method 200, the steps comprising method 200 may be completed in any suitable order.

Method 200 may be implemented using a baseboard management controller 108, and/or any other system operable to implement method 200. In certain embodiments, method 200 may be implemented partially or fully in software and/or firmware embodied in computer-readable media.

A management module 112 may perform a persistent memory save operation in the event of a partial or full power loss scenario. Using existing approaches, when a persistent memory save operation is triggered, the management module 112 may activate energy storage devices 116 on each host information handling system 102 and power off any remaining healthy PSUs 110. Using energy from energy storage devices 116, host information handling systems 102 are expected to complete their individual persistent memory save operations, and the management module 112 may be configured to power off the energy storage devices 116 after a defined period of time (e.g., 140 seconds) which should be sufficient to complete save operations. The result may be a chassis 101 with all of its components turned off which may undergo an alternating current (AC) power cycle when power again becomes available. Such AC power cycle occurring at the end of a save operation may be desirable to return all hardware and firmware of chassis 101 to a known state after a persistent memory save operation. However, under such existing approaches, a chance of data loss exists if a persistent memory subsystem of a host information handling system 102 is unhealthy.

Accordingly, management module 112 may be configured to take a different path of execution when a save operation is triggered by a partial power loss and at least one host information handling system 102 has an unhealthy persistent memory subsystem. In this case, management module 112 may refrain from powering off healthy PSUs 110 during the save operation, and may refrain from powering off energy storage devices 116 after the usual defined period of time. This may allow healthy PSUs 110 to provide electrical energy to complete the save operation on the individual host information handling systems 102, and provide additional time for host information handling systems 102 to successfully complete save operations. After all host information handling systems 102 have completed their individual save operations, management module 112 may return to its "normal" execution of the save operation to perform an AC power cycle after successful completion of save operations. In the event any host information handling system 102 is unable to complete the save operation, management module 112 may enable chassis 101 to be powered from healthy PSUs 110, thus enabling alternative methods (e.g., via human interaction) for preserving data and thus preventing data loss.

FIG. 3 illustrates a flow chart of an example method 300 for controlling components of chassis 101 during performance of a save operation, in accordance with embodiments of the present disclosure. According to some embodiments, method 300 may begin at step 302. As noted above, teachings of the present disclosure may be implemented in a variety of configurations of information handling system 102. As such, the preferred initialization point for method 300 and the order of the steps comprising method 300 may depend on the implementation chosen.

At step 302, in response to an input source power event causing a partial power loss from PSUs 110 (e.g., failure of one or more but not all of PSUs 110), management module 112 may begin a persistent memory save operation for those host information handling systems 102 which are armed for performing a persistent memory save operation. At step 304, as part of the persistent memory save operation, management module 112 may cause powering on of all energy storage devices 116 and may leave all healthy PSUs 110 (e.g., PSUs 110 which did not contribute to the partial power loss) powered on. In addition, at step 306, as part of the persistent memory save operation, management module 112 may begin a timer of predetermined duration (e.g., 140 seconds).

At step 308, management module 112 may determine if all host information handling systems 102 armed for a persistent memory save operation have a healthy persistent memory health status. Management module 112 may make such determination based on individual health status indicators communicated from the various host information handling systems 102. If all host information handling systems 102 armed for a persistent memory save operation have a healthy persistent memory health status, method 300 may proceed to step 312. Otherwise, method 300 may proceed to step 310.

At step 310, in response to one or more host information handling systems 102 armed for a persistent memory save operation having an unhealthy persistent memory health status, management module 112 may monitor the completion status of the individual save operations of each host information handling system 102. Once the individual save operations of each host information handling system 102 have completed, method 300 may proceed to step 312. Until individual save operations of each host information handling system 102 have completed, method 300 may remain at step 310. In some instances, an individual save operation for a host information handling system 102 may not complete or may not complete after a long period of time, in which case, method 300 may remain at step 310 indefinitely. Accordingly, in some embodiments, if method 300 remains at step 310 for longer than a defined period of time, management module 112 may communicate an appropriate alert to a user (e.g., administrator) of chassis 101, and such user make take remedial action to ensure the persistent memory data is properly saved and manually initiate a restart of chassis 101 and its components.

At step 312, management module 112 may determine if the timer initiated at step 306 has expired. Once such timer has expired, method 300 may proceed to step 314. Until such timer has expired, method 300 may remain at step 312.

At step 314, management module 112 may cause powering down of PSUs 110. At step 316, management module 112 may cause an AC power cycle of chassis 101 and its components.

Although FIG. 3 discloses a particular number of steps to be taken with respect to method 300, method 300 may be executed with greater or fewer steps than those depicted in FIG. 3. In addition, although FIG. 3 discloses a certain order of steps to be taken with respect to method 300, the steps comprising method 300 may be completed in any suitable order.

Method 300 may be implemented using management module 112 and/or any other system operable to implement method 300. In certain embodiments, method 300 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. A method comprising, in response to a partial power loss in a chassis providing a common hardware infrastructure to a plurality of modular information handling systems:
    causing powering on of energy storage devices integral to the plurality of modular information handling systems;
    causing healthy power supply units configured to provide electrical energy to the plurality of modular information handling systems and other components of the chassis to remain powered on;
    determining whether any persistent memory subsystem of the plurality of modular information handling systems has an unhealthy health status; and
    responsive to determining that at least one of the persistent memory subsystems of the plurality of modular information handling systems has an unhealthy health status, powering off the healthy power supply units only after individual persistent memory save operations have completed on all of the plurality of modular information handling systems.

2. The method of claim 1, further comprising:
    initiating a timer of a defined duration; and
    responsive to determining that at least one of the persistent memory subsystems of the plurality of modular information handling systems has an unhealthy health status, powering off the healthy power supply units only after individual persistent memory save operations have completed on all of the plurality of modular information handling systems and the timer has expired.

3. The method of claim 1, further comprising:
    receiving from each particular modular information handling system of the plurality of modular information handling systems a respective health status indicator indicative of a runtime health status of the particular modular information handling system; and
    determining whether any persistent memory subsystem of the plurality of modular information handling systems has the unhealthy health status based on the health status indicators received from the plurality of modular information handling systems.

4. An article of manufacture comprising:

a non-transitory computer-readable medium; and computer-executable instructions carried on the computer-readable medium, the instructions readable by a processor, the instructions, when read and executed, for causing the processor to, in response to a partial power loss in a chassis providing a common hardware infrastructure to a plurality of modular information handling systems:

cause powering on of energy storage devices integral to the plurality of modular information handling systems;

cause healthy power supply units configured to provide electrical energy to the plurality of modular information handling systems and other components of the chassis to remain powered on;

determine whether any persistent memory subsystem of the plurality of modular information handling systems has an unhealthy health status; and responsive to determining that at least one of the persistent memory subsystems of the plurality of modular information handling systems has an unhealthy health status, power off the healthy power supply units only after individual persistent memory save operations have completed on all of the plurality of modular information handling systems.

5. The article of claim 4, the instructions for further causing the processor to:

initiate a timer of a defined duration; and responsive to determining that at least one of the persistent memory subsystems of the plurality of modular information handling systems has an unhealthy health status, power off the healthy power supply units only after individual persistent memory save operations have completed on all of the plurality of modular information handling systems and the timer has expired.

6. The article of claim 4, the instructions for further causing the processor to:

receive from each particular modular information handling system of the plurality of modular information handling systems a respective health status indicator indicative of a runtime health status of the particular modular information handling system; and determine whether any persistent memory subsystem of the plurality of modular information handling systems has the unhealthy health status based on the health status indicators received from the plurality of modular information handling systems.

7. A management module configured to, in a chassis providing a common hardware infrastructure to a plurality of modular information handling systems, in response to a partial power loss in the chassis providing a common hardware infrastructure to a plurality of modular information handling systems:

cause powering on of energy storage devices integral to the plurality of modular information handling systems;

cause healthy power supply units configured to provide electrical energy to the plurality of modular information handling systems and other components of the chassis to remain powered on;

determine whether any persistent memory subsystem of the plurality of modular information handling systems has an unhealthy health status; and responsive to determining that at least one of the persistent memory subsystems of the plurality of modular information handling systems has an unhealthy health status, power off the healthy power supply units only after individual persistent memory save operations have completed on all of the plurality of modular information handling systems.

8. The management module of claim 7, further configured to:

initiate a timer of a defined duration; and responsive to determining that at least one of the persistent memory subsystems of the plurality of modular information handling systems has an unhealthy health status, power off the healthy power supply units only after individual persistent memory save operations have completed on all of the plurality of modular information handling systems and the timer has expired.

9. The management module of claim 7, further configured to:

receive from each particular modular information handling system of the plurality of modular information handling systems a respective health status indicator indicative of a runtime health status of the particular modular information handling system; and determine whether any persistent memory subsystem of the plurality of modular information handling systems has the unhealthy health status based on the health status indicators received from the plurality of modular information handling systems.

* * * * *